Figure 1:
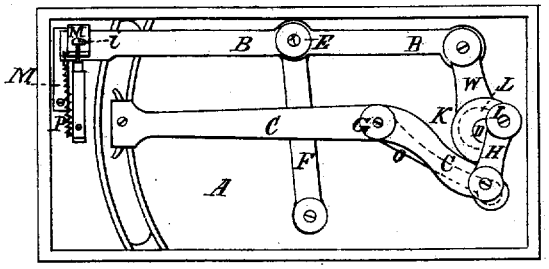

C. F. HARLOW.

Assignor, by mesne Assignments, to W. L. GROUT,

Sewing-Machine.

No. 8,283. Reissued June 11, 1878.

*Witnesses:*

*H. E. Renick*

*E. A. Phelps.*

*Inventor:*

*Charles F. Harlow,*

*by A. H. Flower, atty.*

N. PETERS, PHOTO-LITHOGRAPHER, WASHINGTON, D. C.

UNITED STATES PATENT OFFICE.

CHARLES F. HARLOW, OF BOSTON, ASSIGNOR, BY MESNE ASSIGNMENTS, TO WILLIAM L. GROUT, OF EAST STOUGHTON, MASSACHUSETTS.

IMPROVEMENT IN SEWING-MACHINES.

Specification forming part of Letters Patent No. 107,041, dated September 6, 1870; antedated August 27, 1870; Reissue No. 8,283, dated June 11, 1878; application filed December 31, 1877.

*To all whom it may concern:*

Be it known that I, CHARLES F. HARLOW, of Boston, Massachusetts, have invented certain Improvements in Sewing-Machines, of which the following is a specification and the accompanying drawing an illustration.

My invention consists in a new combination of devices for operating the feed-bar of what is known as the "four-motion feed;" and also in a new combination and arrangement of mechanism for actuating the shuttle; and also in the described combination of said parts with relation to each other, whereby the shuttle and the feed mechanism are actuated in unison by the driving-shaft.

My improvements are applied upon the under side of the bed of a sewing-machine, as shown in the drawing, in which A represents the bed; B, the feed-lever; C, the shuttle-carrier, and D the driving-shaft. Each of the levers B and C is pivoted, the former having a movable fulcrum at E on the end of the rod F, and the latter a fixed one at G, and both levers are actuated from the driving-shaft D. The shuttle-carrier C, which rocks upon the hub G, is driven by connecting its rear end, by means of the link H, with the crank-pin I in the hub K, which is fixed on the driving-shaft. The feed-lever B, which swings upon the movable fulcrum E, is actuated by connecting its rear end with an eccentric, L, forming part of the hub K. The driving-shaft D being vertical, and bearing the eccentric-hub K L, motion in horizontal planes is readily communicated, as shown, to the feed and the shuttle mechanism by the eccentric and the crank movements, respectively.

The machine is provided with suitable needle-operating mechanism and a proper driving apparatus, by which motion is communicated to the working parts, and, in respect to such features as are not fully described and shown, is constructed in the usual manner.

I am aware that in a work entitled "Die Nähmaschine," published in Berlin, in 1863, by Dr. R. Herzberg, there is suggested on page 60, and in Fig. 47 of Plate VII, a shuttle mechanism somewhat analogous to that herein set forth, but differing, essentially, in having the main shaft horizontal and its crank working in a vertical plane to drive the shuttle horizontally, and hence requiring awkward or complicated connections, making the machine greatly inferior to mine. I disclaim the invention and the arrangement of mechanism therein referred to, and limit myself expressly to devices embodying a vertical driving-shaft and horizontal crank movement with the simple link-connection to the shuttle-carrier. (Shown in Fig. 1.)

Figure 3:
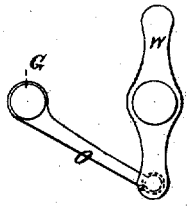

The manner of connecting the feed-lever with the eccentric (illustrated in Fig. 3 of the drawing) is as follows: A bar, W, is attached at one end to the end of the feed-lever B, and is connected at the other end with a swinging lever, O, hung to the hub G, and attached to said bar by being let into a recess in it, as indicated in dotted lines. The eccentric L revolves within the cylindrical aperture in the bar W, secured to the lever B, thus giving to said bar and to the feed-lever a peculiar reciprocating lateral and elliptical motion, and the feed is effected thereby, as will now be described.

Figure 2:
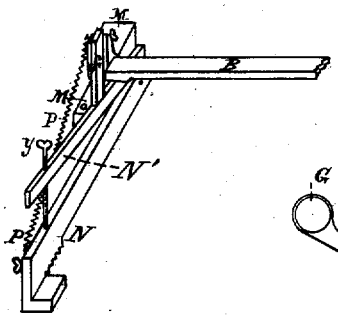

When the machine is put in practical operation, and the various motions are imparted to the several bars and levers, as already described, the bar B, Fig. 2, is driven forward, forcing its wedge-shaped end between the fixed block M and the under side of the jointed feed-bar N N′, and overcoming the spiral spring P, attached to said fixed block and feed-bar, raises said feed-bar through a slot in the table, and brings the roughened surface of said feed-bar in contact with the material to be fed along and stitched. Then said feed-lever B receives a lateral rocking motion on its hub E, which brings its end against the post *f* on the bar N′, and, continuing to move in that direction, it carries said post and feed-bar with it, thus causing the material, against which said roughened surface bears, to be fed along, as desired.

The reverse motions, which now follow, of the feed-lever release the feed-bar N N′ from the upward and forward pressure, and allow the spring P to bring it back to its first position, when the post *f* rests against the end of the screw *i*, which is adjustable against said post, for the purpose of regulating the backward vibration of said feed-bar, thus measuring the length of the stitches in the material sewed. The screw *y* is used to regulate the extent of the projection of the feed-surface through the slot in the table, to adapt it more perfectly to the varying materials sewed.

The shuttle-carrier C reaches to and partly covers the raceway in which the shuttle travels, so as to have direct and positive communication therewith to carry the shuttle forward and backward at the instant required in forming the stitch.

I claim as of my invention—

1. In combination with the roughened feed-surface of a sewing-machine and a retracting-spring, the wedge-ended lever B, having a movable fulcrum, and actuated by means of an eccentric mounted upon the driving-shaft, as described, so as to rotate within the cylindrical perforation of a connecting-bar jointed to the feed-lever and bed, substantially as set forth.

2. The combination and arrangement of the vertical driving-shaft D, crank-pin I, link H, and pivoted carrier C, adapted to drive the shuttle in a curved raceway, substantially as set forth.

3. The driving-shaft D, carrying the eccentric L and crank-pin I, in combination with the feed mechanism and the link and shuttle-carrier, respectively, actuated thereby, substantially as set forth.

CHARLES F. HARLOW.

Witnesses:

A. H. SPENCER,
C. G. KEYES.